Feb. 2, 1932. P. N. BOSSART 1,843,477

RAILWAY TRAFFIC CONTROLLING APPARATUS

Original Filed May 29, 1930

INVENTOR:
P. N. Bossart,
by A. L. Vencill
His Attorney

Patented Feb. 2, 1932

1,843,477

UNITED STATES PATENT OFFICE

PAUL N. BOSSART, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY TRAFFIC CONTROLLING APPARATUS

Application filed May 29, 1930, Serial No. 456,962. Renewed February 13, 1931.

My invention relates to railway traffic controlling apparatus, and particularly to automatic train controlling apparatus of the intermittent inductive type. More particularly, my present invention relates to improvements in the railway traffic controlling apparatus disclosed and claimed in Letters Patent of the United States, No. 1,773,297, issued to me on Aug. 19, 1930.

I will describe two forms of apparatus embodying my invention, and will then point out the novel features thereof in claims.

Figure 1:
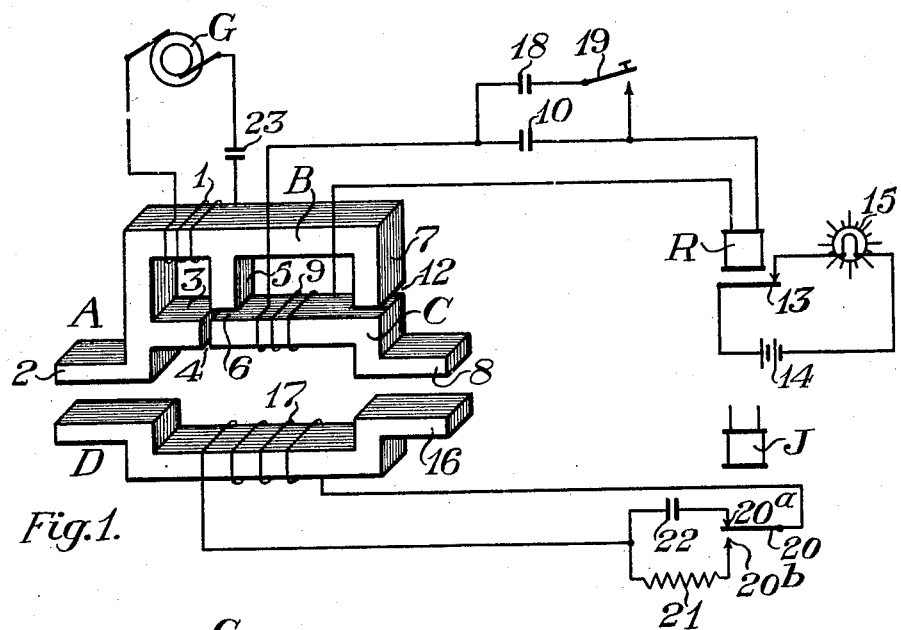
Figure 2:
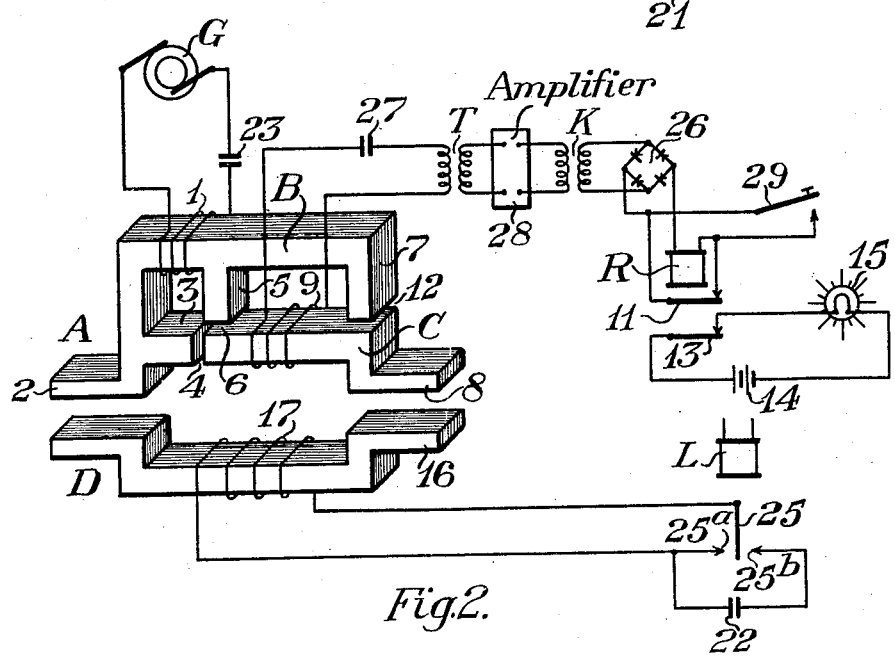

In the accompanying drawings, Fig. 1 is a diagrammatic view showing one form of apparatus embodying my invention. Fig. 2 is a similar view showing a modified form of the apparatus illustrated in Fig. 1, and also embodying my invention.

Similar reference characters refer to similar parts in both views.

Referring first to Fig. 1, the reference character A designates a train-carried receiver comprising a magnetizable core B and a magnetizable bridging member C. In the form illustrated in the drawings, the left-hand end of the core B is provided with a leg 3 extending toward the left-hand end of the bridging member C but separated therefrom by an air gap 4. Core B terminates in a pole 2 adjacent the trackway. Core B is also provided with a leg 5 adjacent the left-hand end of member C but separated therefrom by an air gap 6. Furthermore, a leg 7 on the core B extends toward the right-hand end of member C but is separated from the member by an air gap 12. The right-hand end of the member C terminates in a pole 8 similar to pole 2 of core B.

Located on core B between legs 3 and 5 is a primary 1 which is constantly supplied with alternating current from a generator G, the circuit for this winding preferably but not necessarily including a condenser 23 by means of which the circuit is tuned to resonance at the frequency of the current supplied by the generator G. The member C carries a secondary 9 which is provided with a circuit including the winding of a relay R and a condenser 10. A condenser 18 may be connected in parallel with the condenser 10 in this circuit by means of a manually controlled normally open switch 19. The capacities of the condensers 10 and 18 are such that when these condensers are connected in parallel, and the relay is deenergized, the secondary circuit is tuned to resonance at the frequency of the current supplied by generator G, so that if an electromotive force is induced in the secondary 9 under these conditions by flux in the bridging member C, a current of comparatively large magnitude will flow in this circuit. When only the condenser 10 is connected in the secondary circuit, however, this circuit is slightly detuned, that is to say, if an electromotive force is then induced in the secondary 9 by flux in the bridging member C, an appreciable current will still flow in this circuit but the magnitude of this current with the relay deenergized will be somewhat less than when the condensers 10 and 18 are connected in parallel in this circuit. When the relay is closed, the circuit may be approximately tuned by condenser 10 so as to increase the holding current supplied to the relay. The relay R may be utilized in any suitable manner to control train-carried governing means; as here shown, a front contact 13 of this relay is included in circuit with a battery 14 and a lamp 15 so that the lamp will be lighted when the relay is energized.

It will be observed that the flux created in core B by the current in primary 1 takes two paths, a portion of this flux traversing the path including leg 3, air gap 4, bridging member C, air gap 6 and leg 5, and another portion of this flux traversing a magnetic circuit including the left-hand end of core B, pole 2, the air gap between poles 2 and 8, bridging member C, air gap 12, and leg 7. The parts are so proportioned that the reluctance of those portions of the core B and the member C which are included in the circuits just described form a comparatively insignificant part of the total reluctance of these circuits. It will be plain, therefore, that the magnetic structure of the receiver A is analogous to the electric circuits well known to the art as the Wheatstone bridge, the air gaps 4 and 6 forming two arms of the bridge and the air gap between poles 2 and 8 and the air gap 12 forming the other arms of the bridge.

Located in the trackway is a controlling element D comprising a magnetizable core 16 provided with a winding 17. The winding 17 is arranged to be connected in series with a condenser 22 or a resistor 21 through a front contact 20—20$^a$ or a back contact 20—20$^b$, respectively, of a relay J. The relay J, in turn, may be controlled in any suitable manner. For example, the relay J may be controlled by traffic conditions in such manner that when traffic conditions in advance of the controlling element D are safe, relay J is energized, but that when traffic conditions in advance of the controlling element are dangerous, relay J is deenergized. The capacity of condenser 22 is preferably such that the reactances of winding 17 and this condenser are substantially equal and opposite at the frequency of the current supplied by generator G. The element D is located adjacent the path of travel of the receiver A and is so disposed that when the receiver passes over the element D the core 16 is introduced into the air gap between the poles 2 and 8 of the receiver. The parts are so proportioned that, in contact 20—20$^b$ of relay J is closed when the receiver is over the trackway element, so that winding 17 of the trackway element is connected in series with resistance 21, the ratio of the reluctance of air gaps 4 and 6 is equal to the ratio of the reluctance of the path between poles 2 and 8 through the core 16 to the reluctance of the air gap 12. This is the condition of balance for the magnetic bridge, that is to say, under these conditions, the magnetic potentials of the two ends of the core C are equal so that there is substantially no flux linking the secondary 9. Under these conditions, therefore, no electromotive force is induced in secondary 9, and relay R is deenergized. If, however, contact 20—20$^a$ of relay J is closed when the receiver A is over the trackway element D, so that winding 17 of trackway element D is connected in series with condenser 22, the reluctance of the path between poles 2 and 8 through the core 16 is different from the reluctance of this path when the winding 17 is connected in series with resistor 21, the phase of the flux in this path is changed, due to the resonant circuit for winding 17, and the bridge is then considerably unbalanced, so that a considerable difference of magnetic potential exists between the two ends of the bridging member C. An alternating flux therefore links secondary 9 and there is reduced in secondary 9 an alternating electromotive force. The magnitude of this electromotive force is such that if switch 19 is closed under these conditions, the magnitude of the current which is supplied to relay R will be sufficient to pick this relay up. When the receiver is not located over the element D, the reluctance of the path between the poles 2 and 8 is greater than the reluctance of this path when the core 16 is included in this path and the winding 17 is connected in series with resistor 21, but is less than the reluctance of this path when the core 16 is included in this path and the winding 17 is connected in series with the condenser 22. Under these conditions, therefore, the bridge is still unbalanced so that an electromotive force is still induced in secondary 9. The magnitude of this electromotive force is effective to supply relay R with sufficient current to hold the relay picked up if the relay has once been picked up, but is not sufficient to pick this relay up when the relay is deenergized even though switch 19 is closed. The path of the predominating or effective flux through secondary 9 under either of the two last described conditions may be traced from primary 1 on core B, through leg 3, air gap 4, member C, air gap 12, leg 7, and core B back to primary 1.

It is of course well known that eddy currents in the iron portions of the receiver A and the trackway element D will cause magnetomotive forces which are substantially 90° out of phase with the magnetomotive force created by the primary 1. The receiver and the trackway element should therefore be so proportioned that these quadrature magnetomotive forces in the separate arms of the magnetic bridge are in the same ratio as the reductance of the air gaps so that there will be no electromotive force induced in secondary 9 when the receiver is over an element D having its winding 17 connected in series with the associated resistor 21.

In explaining the operation of the apparatus, I will first assume that when the train passes over the trackway element D, contact 20—20$^b$ of relay J is closed so that winding 17 is connected in series with resistor 21. Under these conditions, the introduction of the core 16 into the magnetic path between poles 2 and 8 will decrease the reluctance of this path to the value at which the bridge is balanced so that no flux will link secondary 9, and relay R will become deenergized to display a stop indication on the train. After relay R has once been deenergized, the relay cannot again be picked up unless switch 19 is closed while the train is passing a trackway element D having its winding 17 connected in series with the associated condenser 22. The reason for this is that, due to the proportioning of the parts pointed out hereinbefore, when the train-carried receiver is not over a trackway element D having its winding 17 connected in series with the associated condenser 22, the electromotive force which is induced in secondary 9 by flux in the bridging member D does not have sufficient magnitude to cause relay R to pick up even though switch 19 is closed. When switch 19 is closed, however, and the train-carried receiver passes a trackway element D having its winding 17 connected in series with the associated condenser 22, the introduction of the core 16 into the magnetic path between the poles 2 and 8 under these conditions unbalances the bridge to such an extent that the electromotive force which is then induced in winding 9 is of such magnitude that the current in the circuit for relay R will build up to a value which is effective to pick relay R up. Switch 19 may then be opened and relay R will remain picked up, attention being called to the fact that the ceurrent required to hold the ordinary alternating current tractive relay up, is considerably less than that required to pick it up. When relay R is picked up the parts are restored to their normal conditions in which they are illustrated in the drawings.

It will be readily understood from the foregoing that if the train-carried relay R is picked up when the train passes a trackway element having its winding 17 connected in series with the associated condenser 22, the only effect of the trackway element on the train-carried apparatus will be to produce a momentary increase in the current which is normally supplied to relay R. Under these conditions, therefore, relay R will remain energized so that the normal proceed indication will continue to be displayed on the train.

It should be particularly pointed out that the use of the resistor 21 connected in series with the winding 17 of the trackway element D for obtaining the balanced condition of the magnetic bridge which causes relay R to become deenergized, in combination with condenser 22 connected in series with the winding 17 in the manner described for obtaining the unbalanced condition of the bridge necessary for picking relay R up after the relay has once been deenergized, provides a large variation in the magnitude of the current which flows in the circuit for relay R, thereby permitting the use of a relay having considerable difference between its pick up and release values. This greatly increases the safety factor of the apparatus and makes it possible to design a train-carried receiver which will readily distinguish between trackway elements and masses of iron in the trackway such as the rails of crossovers, etc.

Referring now to Fig. 2, the secondary 9 is connected in series with the primary of a transformer T and a condenser 27, this circuit being preferably but not necessarily tuned to resonance at the frequency of generator G. The secondary of transformer T is connected with the primary of a transformer K through an amplifier 28 of any suitable form. The secondary of transformer K is connected, through a rectifier 26, with the winding of relay R over a front contact 11 of this relay. Relay R controls a lamp 15 in the same manner as in Fig. 1. The parts are so proportioned that under normal conditions the bridge is unbalanced so that an alternating electromotive force is induced in secondary 9 which is effective to hold relay R closed. The winding 17 of trackway element D, as here shown, is arranged to be placed on short-circuit, connected in series with condenser 22, or placed on open circuit, according as a three-position polarized relay L is energized in its normal direction to close its normal contact 25—25$^a$, is energized in its reverse direction to close its reverse contact 25—25$^b$, or is deenergized so that its normal and reverse contacts are both open. The relay L may be controlled by any suitable means forming no part of my present invention and therefore not shown in the drawings. The capacity of the condenser 22 is preferably such that when contact 25—25$^b$ is closed, so that this condenser is connected in series with winding 17, this circuit is tuned to resonance at the frequency of generator G.

The operation of the apparatus shown in Fig. 2 is as follows: The parts are so proportioned that if the receiver passes the trackway element D when relay L is deenergized, so that winding 17 is on open circuit, the ratio of the reluctances of the air gaps 4 and 6 will be equal to the ratio of the reluctance of the path between poles 2 and 8 through the core 16 to the reluctance of the air gap 12. Under these conditions, no electromotive force will be induced in secondary 9, and relay R will therefore become deenergized to display a "stop" indication on the train. Inasmuch as the circuit for relay R includes a front contact 11 of this relay, the relay when once open will remain open until the path through its front contact 11 is shunted, and an electromotive force of sufficient magnitude to pick this relay up is induced in winding 9. The path through the front contact 11 of relay R may be shunted at any time by closing a normally open manually operable switch 29, but the parts are so proportioned that an electromotive force of sufficient magnitude to pick up relay R can not be induced in winding 9 until the train passes a trackway element D having its winding 17 connected in series with the associated condenser 22. When this happens, the introduction of the core 16 into the magnetic path between the poles 2 and 8 unbalances the bridge to a greater extent than the bridge is normally unbalanced as will be readily understood from the description of Fig. 1, and if switch 29 is then closed, the electromotive force which is induced in secondary 9 will be effective to pick up relay R. When relay R is picked up, this relay is held up in the manner already explained, and the apparatus is then restored to its normal condition.

If the train passes the trackway element D when contact 25—25ᵃ of relay L is closed so that winding 17 is on short-circuit, the effect of this element on the train-carried apparatus is neutralized to such an extent that if relay R is energized, it will remain energized, or if it is deenergized, it can not be picked up even though switch 29 is closed. That is to say, when the circuit for winding 17 is closed, this winding practically nullifies the effect of the core 16 on the receiver A.

Although I have herein shown and described only two forms of railway traffic controlling apparatus embodying my invention, it is understood that various changes and modifications may be made therein within the scope of the appended claims without departing from the spirit and scope of my invention.

Having thus described my invention, what I claim is:

1. Railway traffic controlling apparatus comprising a train-carried receiver having a source of periodic magnetomotive force, two magnetic circuits each supplied with flux from said source, a magnetizable member connecting a first point in one such circuit with a second point in the other circuit which is normally at a different potential from said first point, means located in the trackway for at times varying the reluctance of a portion of one of said magnetic circuits to make equal the magnetic potentials of said first and second points on the train, a winding on the train having an electromotive force induced therein in response to flux in said member, an electrical circuit on the train including said winding, manually controlled means for at times tuning said electrical circuit to resonance at the frequency of said electromotive force, and governing means on the train controlled by said electrical circuit.

2. Railway traffic controlling apparatus comprising a train-carried receiver having two magnetic circuits, a source of periodic current on the train, a first winding on the train receiving energy from said source and arranged to create flux in both said magnetic circuits, a magnetizable member connecting a first point in one such circuit with a second point in the other circuit which is normally at a different magnetic potential from said first point, means located in the trackway for at times varying the reluctance of a portion of one of said magnetic circuits to make equal the magnetic potentials of said first and second points on the train, a second winding on said magnetizable member, a third winding, a first condenser, an electrical circuit including said second winding, said third winding, and said first condenser, a second condenser, manually controlled means for at times connecting said second condenser across said first condenser, the parts being so proportioned that when said second condenser is connected across said first condenser said electrical circuit is resonant at the frequency of said source, and governing means on the train responsive to the magnitude of the current in said third winding.

3. Railway traffic controlling apparatus comprising a train-carried receiver having a first magnitizable core, a primary on said first core which is supplied with periodic current for creating a periodic flux in said first core, a magnetizable bridging member having one end spaced from said first core by two air gaps and having the other end spaced from said first core by two other air gaps, a secondary on said bridging member normally having an electromotive force induced therein by flux in said bridging member, a second magnetizable core located in the trackway adjacent the path of travel of said train-carried receiver and adapted to be introduced into one of said air gaps as the train passes said second core, a winding on said second core, a condenser, a resistor, means for connecting said condenser or said resistor in series with said winding, the parts being so proportioned that if said resistor is connected in series with said winding when said second core is introduced into said one air gap the reluctance of said one air gap is varied to such a value that no electromotive force is induced in said secondary but that if said condenser is connected in series with said winding when said second core is introduced into said one air gap the reluctance of said one air gap and the phase of the flux through it are varied to such values that an electromotive force is then induced in said secondary having a magnitude which is greater than the magnitude of the electromotive force which is normally induced in said secondary, a second and a third condenser, a relay; a circuit including said secondary, the winding of said relay, and said second condenser; and manually controlled means for at times connecting said third condenser in parallel with said second condenser, the capacities of said second and third condenser being such that when said second and third condensers are both connected in parallel in said circuit, said circuit is tuned for relay pick up to resonance at the frequency of said source but that when said second condenser only is connected in said circuit said ciruit is partially detuned from resonance at the frequency of said source.

4. Railway traffic controlling apparatus comprising a train-carried receiver having a first magnetizable core, a primary on said core which is supplied with periodic current for creating a periodic flux in said core, a magnetizable bridging member having one end spaced from said core by two air gaps and having the other end spaced from said core by two other air gaps, a secondary on said bridging member normally having an electromotive force induced therein by flux in said bridging member, a second magnetizable core located in the trackway adjacent the path of travel of said train-carried receiver and adapted to be introduced into one of said air gaps as the train passes said second core, a winding on said second core, a condenser, means for at times connecting said winding in series with said condenser and for at other times short-circuiting said winding, the parts being so proportioned that if said winding is short-circuited when said second core is introduced into said one air gap said second core will have no effect on said train-carried receiver but that if said winding is connected in series with said condenser when said second core is introduced into said one air gap the reluctance of said one air gap will be varied to such a value that an electromotive force will then be induced in said secondary having a magnitude which is greater than the magnitude of the electromotive force which is normally induced in the secondary, a relay receiving energy from said secondary, and governing means controlled by said relay.

5. Railway traffic controlling apparatus comprising a train-carried receiver having a first magnetizable core, a primary on said core which is supplied with periodic current for creating a periodic flux in said core, a magnetizable bridging member having one end spaced from said core by two air gaps and having the other end spaced from said core by two other air gaps, a secondary on said bridging member normally having an electromotive force induced therein by flux in said bridging member, a second magnetizable core located in the trackway adjacent the path of travel of said train-carried receiver and adapted to be introduced into one of said air gaps as the train passes said second core, a winding on said second core, a condenser, means for at times connecting said winding in series with said condenser and at other times placing said winding on short circuit and at still other times placing said winding on open circuit, the parts being so proportioned that if said winding is on short circuit when said second core is introduced into said one air gap the second core will have no effect on the receiver while if the winding is connected with the condenser the reluctance of said one air gap will be varied to such value that an electromotive force greater than normal will then be induced in the secondary, whereas if the winding is on open circuit the electromotive force in the secondary will be reduced below normal, a relay receiving energy from said secondary, and governing means controlled by said relay.

6. Railway traffic controlling apparatus comprising an inductor located in the trackway and controlled by traffic conditions, a train carried receiver having a winding and means for normally supplying an electromotive force to said winding, a train governing relay supplied with current from said winding and normally energized but adapted to become deenergized when said receiver passes a trackway inductor under unsafe traffic conditions, and means on the train requiring a deliberate action on the part of the operator while the receiver is passing an inductor under safe traffic conditions to reenergize said relay.

7. Railway traffic controlling apparatus comprising an inductor located in the trackway and controlled by traffic conditions, a train carried receiver having a winding and means for normally supplying an alternating electromotive force to said winding, a train carried relay, an electrical circuit on the train including said winding and said relay for normally energizing said relay, said receiver operating to deenergize said relay when the receiver passes a trackway inductor under unsafe traffic conditions, and manually controlled means for at times tuning said circuit to resonance at the frequency of said alternating electromotive force to permit said relay to become reenergized only when the receiver passes a trackway inductor under safe traffic conditions.

8. Railway traffic controlling apparatus comprising a train carried receiver having a winding and means for supplying an electromotive force to said winding under normal conditions, a trackway inductor cooperating with said receiver to raise the electromotive force in said winding to a higher value under safe traffic conditions and to reduce such electromotive force to a lower value under unsafe traffic conditions, and a train governing relay receiving energy from said winding and operating to hold a contact closed under normal conditions but to release said contact when the electromotive force in said winding is reduced to said lower value and to require such electromotive force to be raised to said higher value to reclose said contact.

9. Railway traffic controlling apparatus comprising an inductor located in the trackway and controlled by traffic conditions, a train-carried receiver having a winding and means for normally supplying an alternating electromotive force of one value to said winding, a train-carried relay included in a circuit with said winding and arranged to be held in its energized condition in response to said one value of the electromotive force in said winding, said receiver operating to release said relay when the receiver passes a trackway inductor under unsafe traffic conditions and to increase the electromotive force in said winding to a higher value when the receiver passes a trackway inductor under safe traffic conditions, and manually controlled means on the train for at times tuning said circuit to resonance at the frequency of said alternating electromotive force said relay requiring for pick-up that said circuit is tuned and that said higher value of electromotive force is supplied to said winding.

10. Railway traffic controlling apparatus comprising a train-carried receiver having a winding and means for supplying an electromotive force to said winding under normal conditions, a trackway inductor cooperating with said receiver to raise the electromotive force in said winding to a higher value under safe traffic conditions and to reduce such electromotive force to a lower value under unsafe traffic conditions, a manually controlled switch on the train, and a train governing relay receiving energy from said winding and operating to hold a contact closed under normal conditions but to release said contact when the electromotive force in said winding is reduced to said lower value and to require such electromotive force to be raised to said higher value and said switch to be operated to reclose said contact.

In testimony whereof I affix my signature.

PAUL N. BOSSART.